US012170078B2

(12) United States Patent
Iossa et al.

(10) Patent No.: US 12,170,078 B2
(45) Date of Patent: Dec. 17, 2024

(54) SOUND BYPASS

(71) Applicant: McLaren Automotive Limited, Woking (GB)

(72) Inventors: Giuseppe Iossa, Barcelona (ES); Alessio Figuretti, Barcelona (ES); Davide Palmieri, Tarragona (ES); Stefano Izzo, Barcelona (ES)

(73) Assignee: McLaren Automotive Limited, Woking (GB)

(*) Notice: Subject to any disclaimer, the term of this patent is extended or adjusted under 35 U.S.C. 154(b) by 0 days.

(21) Appl. No.: 17/880,437

(22) Filed: Aug. 3, 2022

(65) Prior Publication Data

US 2023/0039045 A1 Feb. 9, 2023

(30) Foreign Application Priority Data

Aug. 3, 2021 (GB) ..................................... 2111213

(51) Int. Cl.
*G10K 11/22* (2006.01)
*F01N 13/10* (2010.01)
(Continued)

(52) U.S. Cl.
CPC ............. *G10K 13/00* (2013.01); *F01N 13/10* (2013.01); *G10K 11/22* (2013.01); *G10K 11/26* (2013.01)

(58) Field of Classification Search
CPC ........ G10K 13/00; G10K 11/22; G10K 11/26; G10K 11/02; G10K 11/08; G10K 15/04;
(Continued)

(56) References Cited

U.S. PATENT DOCUMENTS

| | | | | |
|---|---|---|---|---|
| 811,295 A * | 1/1906 | Houser | .................... | H04R 1/30 181/159 |
| 1,483,759 A * | 2/1924 | Williams | ............. | H04R 1/2865 181/182 |

(Continued)

FOREIGN PATENT DOCUMENTS

| | | | |
|---|---|---|---|
| DE | 10116169 A1 * | 10/2002 | ....... F02M 35/10019 |
| DE | 10149169 C1 * | 12/2002 | ............. G10K 11/22 |

(Continued)

OTHER PUBLICATIONS

GB Search Report in British Appln. No. GB2111213.1, mailed Dec. 30, 2021, 4 pages.

(Continued)

*Primary Examiner* — Edgardo San Martin
(74) *Attorney, Agent, or Firm* — Fish & Richardson P.C.

(57) ABSTRACT

A sound bypass device configured to transmit engine-generated sound pulses from an engine to a sound outlet whilst preventing flow of gases to the sound outlet, the sound bypass device comprising: an input tube configured to conduct the engine-generated sound pulses from the engine; and a sound transmission device connected to the input tube at a first end and to the sound outlet at a second end, the sound transmission device comprising: a first volume connected to the first end, a second volume connected to the second end, and a flexible diaphragm separating the first volume from the second volume and configured to transfer variations in pressure in the first volume to the second volume; wherein the first volume has a cross-sectional area that is greater at the diaphragm than at the first end and the second volume has a cross-sectional area that is greater at the diaphragm than at the second end.

21 Claims, 3 Drawing Sheets

(51) Int. Cl.

| | |
|---|---|
| ***F02M 35/12*** | (2006.01) |
| ***G10K 11/08*** | (2006.01) |
| ***G10K 11/26*** | (2006.01) |
| ***G10K 13/00*** | (2006.01) |

(58) Field of Classification Search

CPC ....... F01N 13/10; F01N 9/02; F02M 35/1238; F02M 35/1294; F02M 35/12; F02M 35/16; B60K 13/04; B60K 13/02; H04R 1/30

See application file for complete search history.

(56) References Cited

U.S. PATENT DOCUMENTS

| | | | | |
|---|---|---|---|---|
| 5,484,969 | A * | 1/1996 | McKendree | G10K 7/06 116/24 |
| 6,600,408 | B1 * | 7/2003 | Walter | B60Q 5/00 340/384.1 |
| 6,644,436 | B2 * | 11/2003 | Hofmann | F02B 77/13 181/240 |
| 6,848,410 | B2 * | 2/2005 | Hoffmann | G10K 11/22 181/204 |
| 7,188,703 | B2 * | 3/2007 | Hofmann | G10K 11/22 181/204 |
| 7,448,353 | B2 * | 11/2008 | Shinada | F02M 35/161 123/184.53 |
| 7,621,370 | B2 * | 11/2009 | Abe | F02M 35/161 181/204 |
| 8,011,469 | B2 * | 9/2011 | Olson | F02M 35/1272 181/204 |
| 8,888,174 | B2 * | 11/2014 | Roggenkamp | F02M 35/1294 296/70 |
| 9,429,116 | B2 * | 8/2016 | Bernard | F02M 35/1222 |
| 9,994,149 | B2 * | 6/2018 | Hillers | G10K 11/22 |
| 11,280,303 | B2 * | 3/2022 | Christensen | F02D 41/021 |
| 2005/0121255 | A1 * | 6/2005 | Hofmann | F02M 35/1294 181/276 |
| 2011/0147116 | A1 | 6/2011 | Olson | |
| 2011/0192368 | A1 * | 8/2011 | Becker | F02M 35/1294 123/184.21 |
| 2013/0199487 | A1 | 8/2013 | Bernard et al. | |
| 2018/0313307 | A1 * | 11/2018 | Naclerio | F02M 35/1222 |
| 2020/0291908 | A1 | 9/2020 | Christensen et al. | |
| 2021/0062696 | A1 | 3/2021 | Iossa et al. | |

FOREIGN PATENT DOCUMENTS

| | | | | |
|---|---|---|---|---|
| DE | 102006028140 | A1 * | 12/2007 | G10K 11/22 |
| DE | 102008009531 | A1 * | 8/2009 | F02M 35/1294 |
| DE | 102010023649 | | 12/2010 | |
| DE | 102011117807 | | 5/2013 | |
| EP | 1138887 | A2 * | 10/2001 | F01N 1/065 |
| EP | 1365120 | A1 * | 11/2003 | F01N 1/22 |
| EP | 1431536 | A1 * | 6/2004 | F01N 13/00 |
| FR | 2644510 | A1 * | 9/1990 | |
| GB | 2539482 | A * | 12/2016 | F02M 35/1294 |
| GB | 2541518 | | 2/2017 | |
| GB | 2556046 | | 5/2018 | |
| JP | S51-94348 | | 7/1976 | |
| JP | 2004218458 | | 8/2004 | |
| JP | 2008150968 | | 7/2008 | |

OTHER PUBLICATIONS

Extended European Search Report in European Appln. No. 22188565.0, dated Dec. 14, 2022, 8 pages.

* cited by examiner

SOUND BYPASS

CROSS-REFERENCE TO RELATED APPLICATIONS

This application claims priority to GB Patent Application No. 2111213.1, filed on Aug. 3, 2021, the entire contents of which are hereby incorporated by reference.

This invention relates to an improved sound bypass device configured to transmit engine-generated sound pulses from the engine of a vehicle.

A vehicle with a fuel-burning engine typically comprises an exhaust system which channels exhaust gases away from the engine so that they can be output from the vehicle. Such an exhaust system normally comprises one or more exhaust components that act on the flow of the exhaust gases, such as a turbo charger which accelerates the flow of gases entering the engine and/or a catalytic converter which converts exhaust gases into less-toxic gases.

As well as channeling exhaust gases, the exhaust system of a vehicle also channels noises from the engine to an output location on the vehicle. Thus, in addition to affecting the flow of gases through the exhaust system, the one or more exhaust components also alter the noises emitted by the engine. In order to reduce muffling and/or alteration of the engine noise by the exhaust components, it is known to provide a sound bypass device within the exhaust system. The sound bypass device is configured to transmit engine-generated sound pulses whilst preventing flow of exhaust gases, thereby providing desirable engine sound noises to the exterior of the vehicle.

A problem associated with known sound bypass devices is that they have associated transmission losses. The transmission loss of a device that transfers energy waves is defined as the ratio between transmitted and incident transmission waves. A high transmission loss value provides a muffling effect on waves, such as sound waves, transferred along a sound bypass device, thereby decreasing the quality of the sound output from the device. This is undesirable for vehicles which comprise sound bypass devices, such as sports cars, because the sound that is generated by such vehicles forms a large part of the impression of the performance of the vehicle. Thus, it is important that the transmission loss is minimised during operative vehicle conditions so that the perceived performance of the vehicle is not adversely affected.

According to a first aspect of the present invention there is provided a sound bypass device configured to transmit engine-generated sound pulses from an engine to a sound outlet whilst preventing flow of gases to the sound outlet, the sound bypass device comprising: an input tube configured to conduct the engine-generated sound pulses from the engine; and a sound transmission device connected to the input tube at a first end and to the sound outlet at a second end, the sound transmission device comprising: a first volume connected to the first end, a second volume connected to the second end, and a flexible diaphragm separating the first volume from the second volume and configured to transfer variations in pressure in the first volume to the second volume; wherein the first volume has a cross-sectional area that is greater at the diaphragm than at the first end and the second volume has a cross-sectional area that is greater at the diaphragm than at the second end.

The first and second volumes may be conical in shape, such that the cross-sectional area of the first and second volumes are defined by respective first and second diameters.

The first and second diameters may increase linearly from the first end to the diaphragm and the second end to the diaphragm respectively.

The first volume may be symmetrical to the second volume about a plane that comprises the flexible diaphragm.

The sound bypass device may further comprise an output tube configured to conduct sound pulses to the sound outlet, wherein the output tube has a cross-sectional area that is greater at the sound outlet than at the second end.

The output tube may be conical in shape, such that the cross-sectional area of the output tube is defined by a third diameter.

The third diameter may increase linearly from the second end to the sound outlet.

The first volume may have a length running from the first end to the diaphragm, the second volume may have a length running from the diaphragm to the second end and the output tube may have a length running from the second end to the sound outlet, the length of the output tube being greater than the length of each of the first and second volumes.

A ratio of a minimum to a maximum diameter of the first volume may be between 1:3 and 1:4. The ratio of the minimum to the maximum diameter of the first volume may be 5:18.

A ratio of a minimum to a maximum diameter of the second volume may be between 1:3 and 1:4. The ratio of the minimum to the maximum diameter of the second volume may be 5:18.

A ratio of a minimum diameter of the first volume to a length from the first end to the diaphragm may be between 1:1 and 2:3. The ratio of the minimum diameter of the first volume to the length from the first end to the diaphragm may be 4:5.

A ratio of a minimum diameter of the second volume to a length from the second end to the diaphragm may be between 1:1 and 2:3. The ratio of the minimum diameter of the second volume to the length from the second end to the diaphragm may be 4:5.

A ratio of a minimum to a maximum diameter of the output tube may be between 1:3 and 1:4, and a ratio of a minimum diameter of the output tube to a length from the second end to the sound outlet may be between 1:3 and 1:5. The ratio of the minimum to the maximum diameter of the output tube may be 5:18, and the ratio of the minimum diameter of the output tube to the length from the second end to the sound outlet may be 1:4.

The first volume may be aligned with the second volume along a common axis.

The output tube may be at least partially aligned the second volume along the common axis.

The output tube may be fully aligned with the second volume along the common axis.

The first volume, the second volume and the output tube may be made from steel or titanium.

The diaphragm may be connected across the sound transmission device to prevent flow of gases from the first volume to the second volume.

The flexible diaphragm may comprise a single flexible membrane.

The flexible diaphragm may comprise: a rigid barrier separating the first volume from the second volume; a first flexible membrane located within the first volume; a second flexible membrane located within the second volume; and a connecting member extending though the rigid barrier and connecting the first flexible membrane to the second flexible membrane, the connecting member being configured to transfer sound vibrations from the first flexible membrane to the second flexible membrane.

The rigid barrier may further comprise a channel through which the connecting member is able to extend, and the flexible diaphragm may further comprise a seal positioned within the channel and configured to hold the connecting member in place within the channel.

The diaphragm may further comprise one or more first balance orifices which are located in the first flexible membrane.

The diaphragm may further comprise one or more second balance orifices which are located in the walls of the second volume.

According to a second aspect of the present invention there is provided a vehicle comprising: an internal combustion engine having at least one cylinder, the internal combustion engine comprising an exhaust manifold for collecting gases expelled from the at least one cylinder;

an air intake system for providing a supply of air to the internal combustion engine; an exhaust system configured to channel gases from the internal combustion engine along a flow path from the exhaust manifold to at least one exhaust outlet, the exhaust system comprising at least one exhaust component configured to act on gases flowing though the exhaust component and causing an alteration to engine-generated sound pulses passing through the exhaust component; and a sound bypass device as claimed in any preceding claim, wherein the inlet tube is connected to a first location on either the air intake system or the exhaust system, and the sound outlet is located at a second location on the exterior or within the cabin of the vehicle.

The present invention will now be described by way of example with reference to the accompanying drawings. In the drawings.

The following description is presented to enable any person skilled in the art to make and use the invention and is provided in the context of a particular application. Various modifications to the disclosed embodiments will be readily apparent to those skilled in the art.

Figure 1:
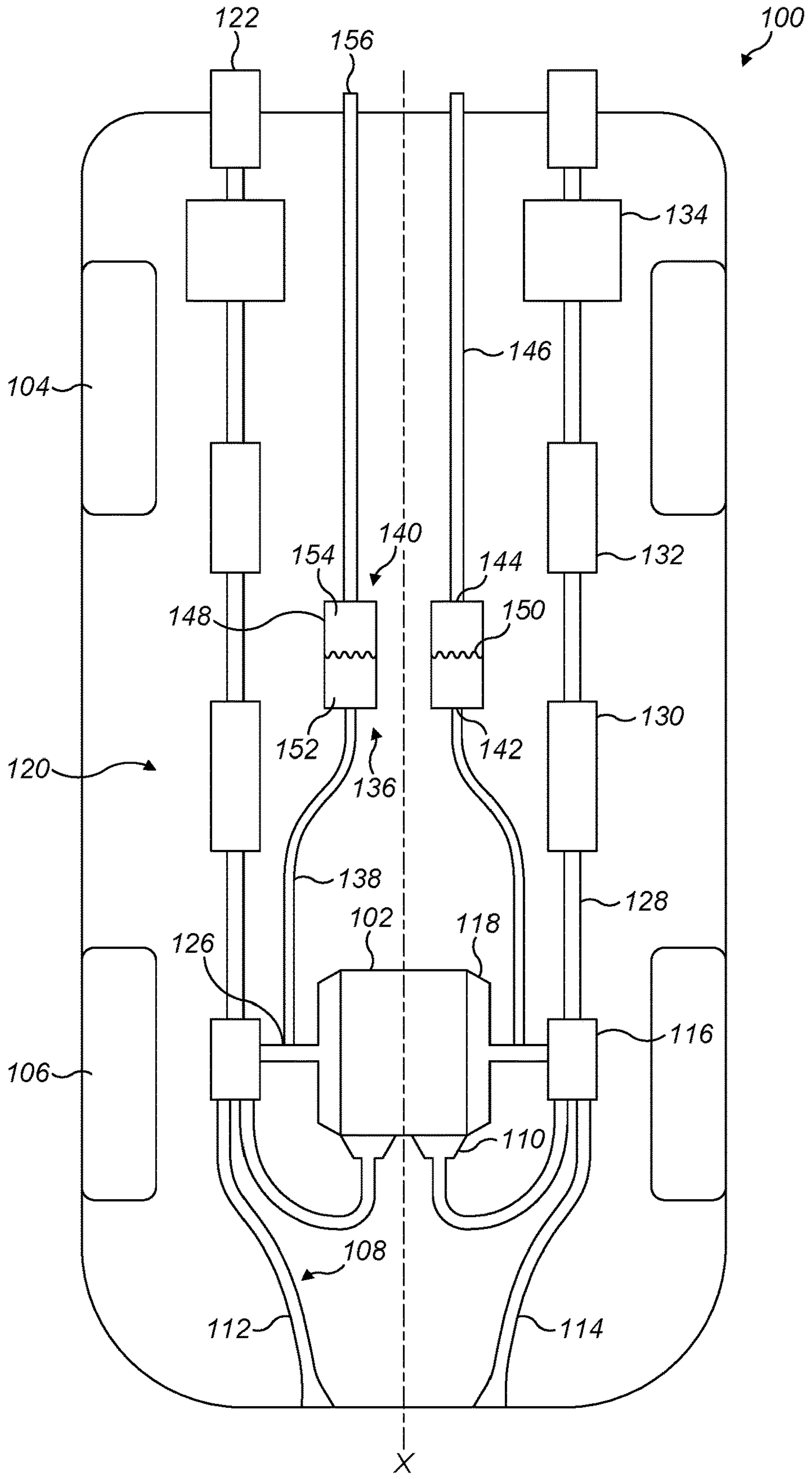
FIG. 1 illustrates a schematic diagram of a vehicle comprising a sound bypass device.

FIG. 1 illustrates an example of a vehicle 100. In this example, the vehicle comprises an arrangement of components that is symmetrical about a line X. The line X traverses the length of the vehicle 100 and bisects the width of the vehicle. Thus, the number and arrangement of components on a first side of this line X are the same as the number and arrangement of components on the second side of the line. Each type of component comprised within the vehicle 100 has only been labeled once in FIG. 1. It would be understood by the skilled person that, as the vehicle is symmetrical about the line X, a component labeled on a first side of the line X corresponds to the same component located on the second side of the line X. The vehicle arrangement illustrated in FIG. 1 is for exemplary purposes only and it would be understood that this is not limiting to the exact arrangement of components that may be comprised within a vehicle according to the present invention.

The vehicle 100 comprises an internal combustion engine 102, which may be coupled to a drive system for the transference of an engine torque to other components of the vehicle. More specifically the torque generated by the internal combustion engine 102 may be transferred from the engine 102 to movable elements 104 of the vehicle 100. Alternatively, internal combustion engine 102 may be coupled to the drive system for the transference of an engine torque to one or more first electrical machines for the generation of drive power. The one or more first electrical machines may be coupled to one or more second electrical machines to receive the drive power and generate motor torques to movable elements 104 of the vehicle 100. These electrical machines together with the internal combustion engine 102 may together form a powertrain of the vehicle 100.

The internal combustion engine 102 of vehicle 100 could be a straight, flat or V-engine having any number of cylinders. The internal combustion engine 102 may be part of a hybrid drive system for the vehicle. For example, the internal combustion engine may be part of a parallel hybrid drive system whereby one or more electrical machines and the internal combustion engine each generate torques that can be used separately and/or in combination to drive the vehicle. In an alternative example, the internal combustion engine may be part of a series hybrid drive system whereby the internal combustion engine is coupled to one or more first electrical machines which generate power from the engine torque generated by the internal combustion engine. The power generated by the one or more first electrical machines may be transferred to one or more second electrical machines to generate motor torques for driving the vehicle.

The vehicle 100 may comprise a plurality of movable elements 104, 106 for supporting the vehicle 100 on a surface. In the example illustrated in FIG. 1, the movable elements are wheels. However, it would be appreciated that the movable elements may be any alternative components that are capable of supporting the vehicle on a surface and transferring engine torque into a driving force for the vehicle, such as tracks. The movable elements will from this point forward be referred to as wheels. Some of those wheels may be drive wheels and some of those wheels may be non-drive wheels, such as wheels 106. It will be appreciated that any configuration of drive 104 and non-drive 106 wheels may be used depending on the particular drive characteristics required by the vehicle 100.

The vehicle 100 may comprise an air intake system 108 for providing a supply of air to the internal combustion engine 102. The intake system 108 may comprise an intake manifold 110 that is fed an air mixture by at least one intake port. In the example shown in FIG. 1, the vehicle comprises two intake manifolds 110 that are fed an air mixture by air inlet pipes 112. Air flows into the intake system from one or more intake inlets 112 via the air inlet pipes 114. Generally, these are located on the exterior of the vehicle to permit air to flow into the inlets. The flow of air into the intake system may be assisted by one or more induction devices. The induction devices may be one or more turbochargers and/or superchargers. In the example shown in FIG. 1, a turbocharger 116 is provided for each intake manifold. Each turbocharger 116 is connected between the intake inlet 112 and its respective intake manifold 110.

The flow of air mixture, via the at least one intake port 112, into the intake manifold 110 may be regulated by at least one throttle. The intake manifold 110 permits the flow of the air mixture from the intake ports 112 to the one or more cylinders of the engine 102. The one or more cylinders each house a piston which is caused to move by the ignition of fuel present in the respective cylinder. The pistons are each coupled to a drive an axle of the engine 102 to enable generation of the engine torque by means of the movement of the pistons. The entry and exit of gases into and out of the cylinders are regulated by a plurality of valves for each cylinder. The plurality of valves comprises intake and exhaust valves. Generally, the intake valves regulate the flow of combustion gases into a cylinder and the exhaust valves regulate the flow of exhaust gases out of a cylinder.

The internal combustion engine 102 may comprise one or more exhaust manifolds 118 which collect the exhaust gases expelled from the cylinders of the engine 102. The exhaust gases are expelled from the cylinders via the plurality of exhaust valves. In the example shown in FIG. 1, the engine 102 comprises two exhaust manifolds 118. Each exhaust manifold collects exhaust gases expelled from a separate set of cylinders of the engine 102.

The vehicle 100 further comprises an exhaust system 120 which channels the exhaust gases from the exhaust manifold to at least one exhaust outlet 122. If there is only one exhaust manifold present in the vehicle then the exhaust system 120 may channel the exhaust gases from that exhaust manifold to at least one exhaust outlet 122. In some vehicles there may be more than one exhaust outlet 122 to which the exhaust gases are channels from the one exhaust manifold. In the example shown in FIG. 1, the engine 102 comprises two exhaust manifolds and the exhaust system 120 channels exhaust gases from a first exhaust manifold to at least one first exhaust outlets and from a second exhaust manifold to at least one second exhaust outlets. The exhaust system may combine the flows of exhaust gases from multiple exhaust manifolds along the path from the exhaust manifolds to at least one exhaust outlet 122.

The exhaust system 120 may comprise one or more exhaust components that acts on the exhaust gases being channeled through the exhaust system. The one or more exhaust components may comprise a turbocharger 116. An exhaust inlet of the turbocharger 116 may be connected to the exhaust manifold 118 by an exhaust pipe 126. The exhaust inlet permits exhaust gases to flow into the turbocharger 116. An exhaust outlet 16 of the turbocharger 116 may permit exhaust gases to flow out of the turbocharger 116. The exhaust outlet 16 may be connected to an exhaust pipe 128 to channel the exhaust gases towards the one or more exhaust outlets. The turbocharger assists the flow of air into the intake manifold by obtaining power from the flow of the exhaust gases through the turbocharger. The turbocharger may comprise a first impeller which assists the flow of air into the intake manifold. This first impeller can be powered by the flow of exhaust gases flowing over a second impeller connected to the first impeller. The turbocharger comprises the second impeller. The presence of the turbocharger in the flow path of the exhaust gases from the exhaust manifold to the one or more exhaust outlets alters the engine sounds that are transmitted along the exhaust system to the one or more exhaust outlets 122. This may mean that the engine sounds from the engine are muffled or otherwise changed. For instance, a turbocharger can add a whining sound to the engine sound being transmitted along the exhaust system.

The one or more exhaust components may alternatively or additionally comprise an exhaust gas treatment device. The exhaust system may comprise more than one exhaust gas treatment device for each channel of exhaust gases from the exhaust manifold to exhaust outlet(s). Examples of exhaust gas treatment devices are catalytic convertors, and gasoline particulate filters otherwise known as anti-particulate filters. Each of these devices acts on the exhaust gases in some way to change the constituents of the exhaust gases. The exhaust system may comprise a catalyst followed by an anti-particulate filter in series connected together by exhaust pipes 128. The exhaust system may comprise a catalyst followed by an anti-particulate filter in series connected together by exhaust pipes 128 for each channel between an exhaust manifold 118 and exhaust outlet 112.

Alternatively or additionally to the above, the one or more exhaust components may comprise a silencer 134. The silencer 134 acts on the flow engine sounds along the exhaust system to change the sounds and/or reduce the level of sounds that flow along the exhaust system.

The vehicle illustrated in FIG. 1 comprises a turbocharger 116, a catalytic convertor 132 and an anti-particulate filter 134 along a first set of exhaust pipes 128 that channel exhaust gases from a first exhaust manifold to at least one exhaust outlet. These exhaust components also act on the exhaust gases produced by the engine 102 so as to alter the sound of the engine that is transmitted along the exhaust system to the one or more exhaust outlets 122. The changes to the engine sounds that are produced by the exhaust components and transmitted along the exhaust system can be detrimental to the perception of the vehicle in certain circumstances. For instance, if the vehicle is a high-performance sports car then the exhaust components may serve to alter the sounds emanating from the exhaust outlets such that there is a reduction in the perception that the vehicle is high-performance.

To address this issue, the vehicle is provided with at least one sound bypass device 136. The sound bypass device 136 allows the engine generated sounds to bypass one or more of the exhaust components while the exhaust gases still flow through the exhaust components. The sound bypass device 136 may or may not reconnect to another part of the exhaust system after it has bypassed one or more exhaust components in the system. In an example, the sound bypass device 136 may be configured to bypass the entire exhaust system. The sound bypass device 136 is configured to transmit engine-generated sounds but not to permit the flow of exhaust gases. In other words, the sound bypass device 136 is configured to prevent the flow of exhaust gases through the sound bypass device 136.

The sound bypass device 136 comprises a sound inlet 126 which is connected to a first location on the exhaust system 120 before one of the exhaust components along the flow path of the exhaust gases. That is, the sound inlet 126 is located closer to the exhaust manifold 118 along the flow of the exhaust gases within the exhaust system than that exhaust component. The sound inlet 126 may be connected to the exhaust system 120 before all of the exhaust components. That is, the sound inlet 126 may be connected to the exhaust system 120 between the exhaust manifold and the first exhaust component along the exhaust system in the direction of flow of the exhaust gases. The sound inlet 126 may be connected to an exhaust pipe which is connected between the exhaust manifold and the first exhaust component. The first exhaust component may be a turbocharger 116 as shown in FIG. 1. In this case, the exhaust pipe to which the sound inlet 126 is connected may be connected to the exhaust inlet of the turbocharger 116. The sound bypass device 136 comprises a sound outlet 156 from which sound is output from the vehicle. The sound outlet 156 may be located at a number of different positions on the exterior of the vehicle. In one example, the sound outlet 156 is located on the roof of the vehicle. In another example, the sound outlet is located on the base of the vehicle. In a further example, the sound outlet 156 is located at the side of the vehicle exterior, next to the engine 102. The sound outlet 156 may alternatively be located inside the body of the vehicle. For example, the sound outlet 156 may be connected to an exhaust outlet 122. The sound outlet 156 may alternatively be located within a cabin of the vehicle, within which a driver of the vehicle is seated.

The sound bypass device 136 comprises a sound transmission device 140 coupled to an input tube 138 at a first end 142 and an output tube 146 at a second end 144. The input tube 138 is configured to conduct engine-generated sound pulses from the first location on the exhaust system 120 to a sound transmission device 140. The sound transmission device 140 is configured to receive the sound pulses from the input tube 138 and transmit them to the sound outlet 156. In one example, a path from the second end 144 of the sound transmission device to the sound outlet 156 is provided by means of an output tube 146. The output tube 146 is configured to conduct sound pulses generated by the engine 102 from the sound transmission device 140 to the sound outlet 156.

Figure 2:
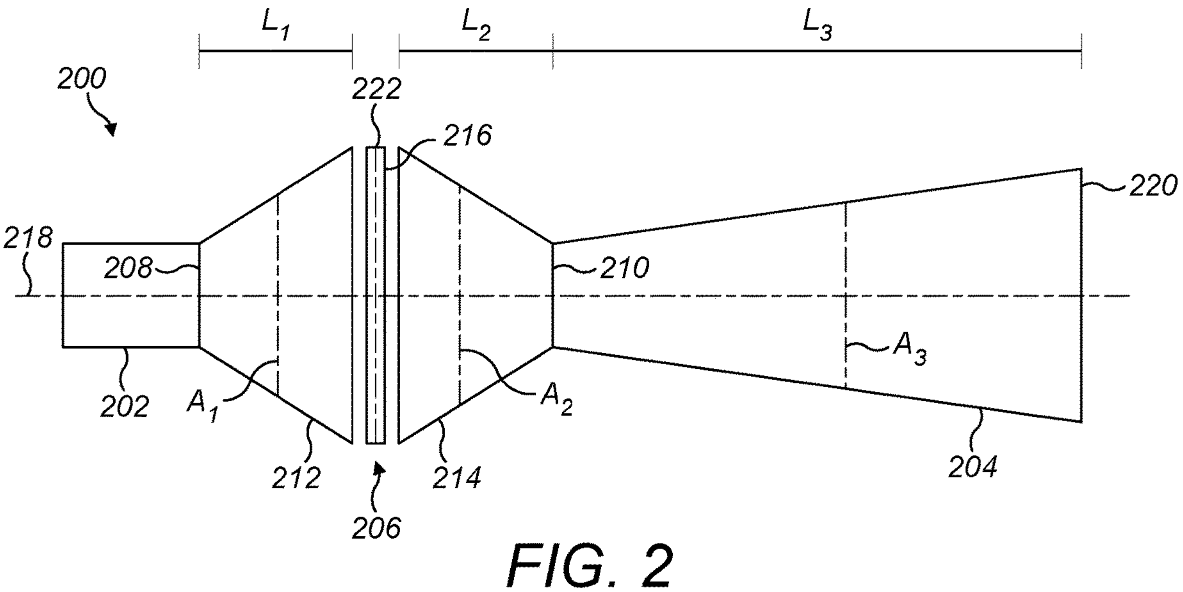
FIG. 2 illustrates the arrangement of an improved sound bypass device.
Figure 3:
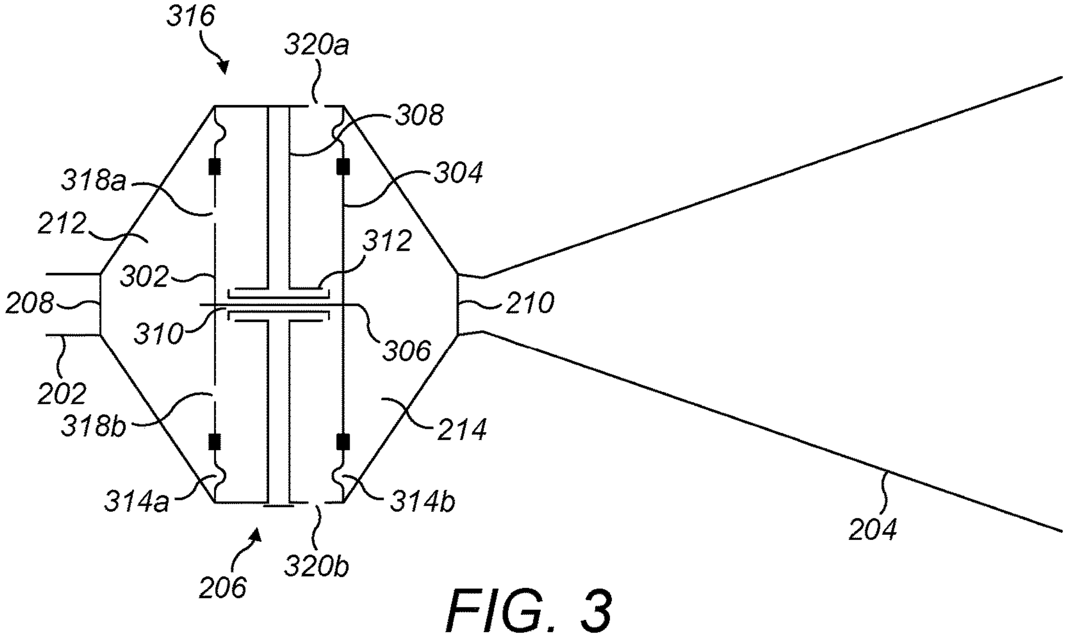
FIG. 3 illustrates the exemplary configuration of a diaphragm for use in the improved sound bypass device illustrated in FIG. 2.

The first end 142 of the sound transmission device 140 may otherwise be referred to as a sound inlet. The input tube 138 is connected to sound inlet 142. The second end 144 of the sound transmission device 140 may otherwise be referred to as a sound outlet 144. The output tube 146 may be connected to the sound outlet 144. The sound transmission device 140 is configured to permit engine-generated sound pulses to be transmitted from the sound inlet 142 to the sound outlet 144. The sound transmission device 140 is configured to prevent the flow of exhaust gases through the sound transmission device 140 from the sound inlet 142 to the sound outlet 144. The sound transmission device 140 comprises a diaphragm 150 housed within a chamber 148. The diaphragm may be formed of one or more membranes. In FIG. 2, the diaphragm 150 is illustrated as a single membrane. In the case where the diaphragm 150 is formed of more than one membrane, the membranes may be spaced apart from each other. The one or more membranes that form the diaphragm 150 may be flat (as illustrated in FIGS. 2 and 3) or may be of any alternatively suitable shape such as conical. The shape of the membrane can advantageously be used to couple the required acoustic performance of the sound transmission device with its structural requirements. An alternative example of the arrangement of a diaphragm for use in the sound bypass device illustrated in FIG. 2 is described below with respect to FIG. 3.

The diaphragm 150 is connected across the width of the chamber 148 such that sound pulses traveling down the input tube 138 into the chamber drive the motion of the diaphragm. The diaphragm 150 moves in response to changes in pressure generated by the engine 102 in the exhaust system 120. Because the diaphragm 150 is configured to move in accordance with sound pulses received from the engine 102, the variations in a first volume 152 located on a first side of the chamber to which the input tube 138 is connected are transferred into a second volume 154 located on a second side of the chamber to which an output tube 142 is connected. Sound pulses traveling down the input tube may therefore pass through the diaphragm 150 and into output tube 146. The diaphragm 150 prevents exhaust gases from flowing from the first volume 152 to which the input tube 138 is connected to the second volume 154 to which the output tube 146 may be connected.

The sound bypass device 136 therefore enables engine-generated sound pulses to be transmitted from one position along the exhaust system 120 to the exterior of the vehicle. The device 136 therefore bypasses the sound-altering exhaust components to provide a greater range of and/or better sounding sound pulses to the exterior of the vehicle.

The particular configuration of an improved sound bypass device 200 to be inserted into the vehicle of FIG. 1 is illustrated in FIG. 2. The sound bypass device 200 may, for example, correspond to or replace the device 136 in FIG. 1.

As mentioned above, the sound bypass device 200 is configured to transmit engine-generated sound pulses from an engine to a sound outlet 220 whilst preventing flow of exhaust gases to the sound outlet 220. The sound bypass device 200 comprises an input tube 202 which may correspond to input tube 138 of the vehicle 100 illustrated in FIG. 1. The input tube 138 is configured to conduct the engine-generated sound pulses from the engine, which may correspond to engine 102 in FIG. 1. The sound bypass device 200 further comprises an output tube 204 which may correspond to the output tube 148 of the vehicle 100 illustrated in FIG. 1. The output tube is configured to conduct sound pulses to the sound outlet 220, which may correspond to outlet 156 in FIG. 1.

The sound bypass device further comprises a sound transmission device 206 which may correspond to the device 140 in FIG. 1. The sound transmission device 206 is connected to the input tube 202 at a first end 208. The first end 208 may otherwise be referred to as the sound inlet or inlet port, as it provides an inlet for exhaust gases and engine noise into the sound transmission device from the inlet tube 202. The sound transmission device 206 is connected to the output tube 214 at a second end 210. The second end 210 may otherwise be referred to as the sound outlet or outlet port as it provides an outlet for engine noise out of the sound transmission device into the output tube 204. The sound transmission device 206 comprises a chamber with a first volume 212 connected to the first end 208 which may correspond to volume 152 illustrated in FIG. 1. The chamber of the sound transmission device 206 further comprises a second volume 214 connected to the second end 210 which may correspond to volume 154 illustrated in FIG. 1. The sound bypass device also comprises a flexible diaphragm 216 that separates the first volume 212 from the second volume 214. The term “flexible” implies that at least part of the diaphragm is capable of flexing in response to sound vibrations passing through the sound bypass device. In other words, at least one component of the diaphragm is capable of flexing in response to sound vibrations. The flexible diaphragm 216 may correspond to the diaphragm 150 illustrated in FIG. 1.

The flexible diaphragm 216 is configured to transfer variations in pressure in the first volume 212 to the second volume 214. In one example the diaphragm 216 is formed of metal. The diaphragm may alternatively be formed from any other material that is able to withstand the temperatures and pressures exerted by engine exhaust gases whilst also being deformable so as to transfer variations in pressure across the chamber of the sound transmission device 206. The diaphragm 216 is connected across sound bypass device 206 to prevent flow of exhaust gases from the first volume to the second volume. In other words, the diaphragm 216 is connected across the chamber formed by the first and second volumes 212, 214 to prevent exhaust gases from flowing from the first side of the chamber to the second side of the chamber.

The first volume 212 comprises a first length $L_1$ which extends between the first end, or sound inlet, 208 and the diaphragm 216. In an example, the first length $L_1$ is aligned along an axis 218. The first volume further comprises a cross-sectional area $A_1$ that is perpendicular to the first length $L_1$ at any given point along the first length $L_1$. The second volume 214 comprises a second length $L_2$ which extends between the second end, or sound outlet, 210 and the diaphragm 216. In an example, the first length $L_1$ is aligned with the second length $L_2$ along the common axis 218. In other words, the first volume 212 may be aligned with the second volume 214 along the common axis. The second volume further comprises a cross-sectional area $A_2$ that is perpendicular to the second length $L_2$ at any given point along the second length $L_2$.

The output tube 204 comprises a third length $L_1$ which extends between the second end 210 and the sound outlet 220. In an example, the third length $L_3$ is at least partially aligned with the second length $L_2$ along the common axis 218. In other words, the output tube 204 may be at least partially aligned with the second volume 214. Where the second volume 214 is aligned with the first volume 212, the output tube is also at least partially aligned with the first volume 212. In a further example, the third length $L_3$ is fully aligned with the second length $L_2$ along the common axis 218. That is, the output tube 204 is fully aligned with the second volume along the common axis 218. The output tube 204 further comprises a cross-sectional area $A_3$ that is perpendicular to the third length $L_3$ at any given point along the first length $L_3$.

The cross-sectional area $A_1$ of the first volume 212 varies across the length $L_1$ of the first volume. More specifically, the cross-sectional area $A_1$ of the first volume 212 is greater at the diaphragm 216 than it is at the first end 208 which connects to the input tube 202. That is, the cross-sectional area $A_1$ of the first volume increases between the first end 208 and the diaphragm 216. In an example, as illustrated in FIG. 2, the cross-sectional area $A_1$ of the first volume increases continuously between the first end 208 and the diaphragm 216. The term "continuously" in this context means that the rate of increase of the cross-sectional area is constant along the length of the volume. In other words, the cross-sectional area $A_1$ of the first volume increases monotonically between the first end 208 and the diaphragm 216. In an alternative example, the increase between the first end 208 and the diaphragm 216 is discontinuous. That is, there may be parts of the first volume 212, along its length $L_1$, in which there is no change in cross-sectional area. There may alternatively or additionally be parts at which the rate of increase of cross-sectional area changes along the length $L_1$ of the first volume, or at which the cross-sectional area decreases. However, in all examples the cross-sectional area $A_1$ at the end of the first length $L_1$ at which the first volume 212 is connected to the diaphragm 216 is greater than the cross-sectional area $A_1$ at the end of the first length $L_1$ at which the first volume 212 is connected to the input tube 202.

The cross-sectional area $A_2$ of the second volume 214 also varies across the length $L_2$ of the second volume. More specifically, the cross-sectional area $A_2$ of the second volume 214 is greater at the diaphragm 216 than it is at the second end 210 which connects to the output tube 204. That is, the cross-sectional area $A_2$ of the second volume decreases between the diaphragm 216 and the second end 210. In an example, as illustrated in FIG. 2, the cross-sectional area $A_2$ of the second volume decreases continuously between the diaphragm 216 and the second end 210. The term "continuously" in this context means that the rate of decrease of the cross-sectional area is constant along the length of the volume. In other words, the cross-sectional area $A_2$ of the second volume decreases monotonically between the diaphragm 216 and the second end 210. In an alternative example, the decrease between the diaphragm 216 and the second end 210 is discontinuous. That is, there may be parts of the second volume 214, along its length $L_2$, in which there is no change in cross-sectional area. There may alternatively or additionally be parts at which the rate of increase of cross-sectional area of the second volume 214 changes, or at which the cross-sectional area decreases. However, in all examples the cross-sectional area $A_2$ at the end of the second length $L_2$ at which the second volume is connected to the diaphragm 216 is greater than the cross-sectional area $A_2$ at the end of the second length $L_2$ at which the second volume is connected to the output tube 204.

The cross-sectional area $A_3$ of the output tube also varies across the length $L_3$ of the output tube. The cross-sectional area $A_3$ of the output tube is greater at the sound outlet 220 than it is at the second end 210 of the sound transmission device 206. That is, the cross-sectional area $A_3$ of the output tube increases between the second end 210 of the sound transmission device and the sound outlet 220. In an example, as illustrated in FIG. 2, the cross-sectional area $A_3$ of the output tube 204 increases continuously between the second end 210 and the sound outlet 220. The term "continuously" in this context means that the rate of increase of the cross-sectional area is constant along the length of the output tube. In other words, the cross-sectional area $A_3$ of the output tube increases monotonically between the second end 210 and the sound outlet 220. In an alternative example, the increase in cross-sectional area $A_3$ is discontinuous. That is, there may be parts of the output tube 204, along its length $L_3$, in which there is no change in cross-sectional area. There may alternatively or additionally be parts at which the rate of increase of cross-sectional area changes, or at which the cross-sectional area decreases. However, in all examples the cross-sectional area $A_3$ at the sound outlet 220 is greater than the cross-sectional area $A_3$ at the end of the second length $L_3$ at which the output tube 204 is connected to the sound transmission device 206.

The first and second volumes, and the output tube, of the sound bypass device may be of any suitable shape. In one example, the first and second volumes are conical in shape. That is, the first and second volumes may resemble the shape of a cone. The first and second volumes may be conical frustums. Thus, the cross-sectional area $A_1$ of the first volume may be circular, and therefore defined by a diameter $d_1$. The cross-sectional area $A_2$ of the second volume may be circular, and therefore defined by a diameter $d_2$.

Where the first and second volumes are conical frustums, the first and second diameters $d_1$, $d_2$ of the first and second volumes respectively vary linearly along their lengths. In a specific example, the first and second volumes may be right conical frustums. That is, the first diameter $d_1$ of the first volume 212 may increase linearly between the first end 208 and the diaphragm 216. In other words, first diameter $d_1$ may increase in the axial direction of the first volume 212. The diameter of the first volume 212 can be measured at any point along this axial length in the radial direction. The second diameter $d_2$ of the second volume 214 decreases linearly between the diaphragm 216 and the second end 210. Put differently, the second diameter $d_2$ of the second volume 214 increases linearly from the second end 210 to the diaphragm. In other words, first diameter $d_2$ may increase in the axial direction of the second volume 214. The diameter of the second volume 214 can be measured at any point along this axial length in the radial direction.

The geometry of the first volume 212 may be symmetrical to the geometry of the second volume 214 about a plane 222 that comprises the flexible diaphragm 216. That is, the length $L_1$ of the first volume may be the same as the length $L_2$ of the second volume. The cross-sectional area $A_1$ of the first volume may vary at the same rate along its length $L_1$ as the corresponding variation in cross-sectional area $A_2$ of the second volume along its length $L_2$. Where the first and second volumes are conical in shape, the minimum diameter of the first volume 212 may be the same as the minimum diameter of the second volume 214. Similarly, the maximum diameter of the first volume 212 may be the same as the maximum diameter of the second volume 214.

The output tube 204 may be conical in shape. That is, the output tube 204 may resemble the shape of a cone. The output tube 204 may be a conical frustum. In a specific example, the output tube 204 may be a right conical frustum. Thus, the cross-sectional area $A_3$ of the first volume may be circular, and therefore defined by a diameter $d_3$. Where the output tube 204 is a conical frustum, the diameter $d_3$ of the output tube increases linearly along its length $L_3$. That is, the diameter $d_3$ of the output tube 204 increases linearly between the second end 210 and the sound outlet 220. The increase in third diameter $d_3$ may increase in the axial direction of the frustrum. The diameter of the output tube 204 can be measured at any point along this axial length of the output tube 204 in the radial direction.

The output tube 204 may have a different length $L_3$ to the lengths $L_1$, $L_2$ of the first and second volumes. In an example, the length $L_3$ of the output tube is greater than the length of each of the first and second volumes $L_1$, $L_2$. Where the first and second volumes 212, 214 are symmetrical about a plane 222 comprising the diaphragm 216, the first and second lengths $L_1$, $L_2$ are the same. In alternative examples, the first length $L_1$ may be different from the second length $L_2$.

Where the first volume 212 is conical in shape, the minimum diameter $d_{1.1}$ defining the minimum cross-sectional area of the first volume 212 may be characterised with respect to the maximum diameter $d_{1.2}$ defining the maximum cross-sectional area $A_{1.2}$ of the first volume 212. That is, the minimum cross-sectional area $A_{1.1}$ of the first volume may differ from the maximum cross-sectional area $A_{1.2}$ of the first volume 212 by a predefined ratio. In an example, the ratio of the minimum to the maximum diameter of the first volume 212 is between 1:3 and 1:4. In a more specific example, the ratio of the minimum to the maximum diameter of the first volume 212 is 5:18. Similarly the minimum diameter $d_{2.1}$ defining the minimum cross-sectional area $A_{2.1}$ of the second volume 214 may be characterised with respect to the maximum diameter $d_{2.2}$ defining the maximum cross-sectional area $A_{2.2}$ of the second volume. In an example, the ratio of the minimum to the maximum diameter of the second volume may be between 1:3 and 1:4. In a more specific example, the ratio of the minimum to the maximum diameter of the second volume may be 5:18.

The minimum diameter $d_{1.1}$ defining the minimum cross-sectional area $A_{1.1}$ of the first volume 212 may be characterised with respect to the length $L_1$ of the first volume. In an example, the ratio of the minimum diameter $d_{1.1}$ to the length $L_1$ of the first volume is between 1:1 and 2:3. That is, the ratio of the minimum diameter $d_{1.1}$ to the length between the first end 208 and the diaphragm 216 is between 1:1 and 2:3. In a more specific example, the ratio of the minimum diameter $d_{1.1}$ of the first volume to the length of the first volume is 4:5. Similarly, The minimum diameter $d_{2.1}$ defining the minimum cross-sectional area $A_{2.1}$ of the second volume 214 may be characterised with respect to the length $L_2$ of the second volume 214. The ratio of the minimum diameter $d_{2.1}$ to the length $L_2$ of the second volume may be between 1:1 and 2:3. In a more specific example, the ratio of the minimum diameter $d_{2.1}$ to the length $L_2$ of the second volume 214 is 4:5.

The maximum diameter $d_{1.2}$ of the first volume 212 may also be defined with respect to the length $L_1$ of the first volume. The ratio of the maximum diameter $d_{1.2}$ of the first volume 212 to the length $L_1$ of the first volume 212 may be between 5:1 and 5:2. In a more specific example, the ratio of the maximum diameter $d_{1.2}$ of the first volume 212 to the length $L_1$ of the first volume 212 is 9:2. The maximum diameter $d_{2.2}$ of the second volume 214 may also be defined with respect to the length $L_2$ of the second volume 214. The ratio of the maximum diameter $d_{2.2}$ to the length $L_2$ of the second volume 214 may be between 5:1 and 5:2. In a more specific example, the ratio of the maximum diameter $d_{2.2}$ to the length $L_2$ of the second volume 214 is 9:2.

The minimum diameter $d_{3.1}$ of the output tube 204 may additionally or alternatively be defined with respect to the maximum diameter $d_{3.2}$ of the output tube 204. In an example, the ratio of the minimum to the maximum diameter of the output tube 204 is between 1:3 and 1:4. In a more specific example, the ratio of the minimum to the maximum diameter of the output tube 204 is 5:18. The minimum diameter $d_{3.1}$ of the output tube 204 may also be defined with respect to the length $L_3$ of the output tube 204. That is, the minimum diameter $d_{3.1}$ of the output tube 204 may also be defined with respect to the length from the second end 210 to the sound outlet 220. The ratio of the minimum diameter $d_{3.1}$ to the length $L_3$ of the output tube 204 may be between 1:3 and 1:5. In a more specific example, the ratio of the minimum diameter $d_{3.1}$ to the length $L_3$ of the output tube 204 is 1:4. The maximum diameter $d_{3.2}$ of the output tube 204 may also be defined with respect to the length $L_3$ of the output tube 204. The ratio of the maximum diameter $d_{3.2}$ of the output tube to the length $L_3$ of the output tube may be between 4:5 and 1:1. In a more specific example, the ratio of the maximum diameter $d_{3.2}$ to the length $L_3$ of the output tube 204 is 9:10. The relative lengths and diameters of the components in the sound bypass device are selected to ensure the optimal transference of pressure through the sound transmission device, and therefore to minimise transmission loss values generated by the device.

The alternative configuration of a diaphragm for use in the improved sound bypass device of FIG. 2 is illustrated in FIG. 3. With the exception of the configuration of the diaphragm, the features of the sound bypass device illustrated in FIG. 3 correspond broadly to those of the respective device that is illustrated in FIG. 2. That is, the bypass device of FIG. 3 comprises an input tube 202 and a sound transmission device 206 corresponding to the respective components illustrated in FIG. 2. The bypass device may further comprise an output tube 204. The sound transmission device 206 comprises a first volume 212 and a second volume 214 separated by the alternative diaphragm 316.

The diaphragm 316 in FIG. 3 differs from that which is illustrated in FIG. 2 in that, instead of consisting of a single membrane, it comprises two membranes that are spaced apart. That is, the diaphragm comprises a first flexible membrane 302 and a second flexible membrane 304. The first flexible membrane 302 is located within the first volume 212 of the sound transmission device 206. The first flexible membrane 302 is connected across the width of the first volume 212. This enables sound pulses traveling through the first volume from the first end 208 of the sound transmission device to drive the motion of the first flexible membrane 302. The second flexible membrane 304 is located within the second volume 214 of the sound transmission device 206. The second flexible membrane 304 is connected across the width of the second volume 214. The first and second membranes 302, 304 may be formed of metal. The first and second membranes may alternatively be formed from any other material that is able to withstand the temperatures and pressures exerted by engine exhaust gases whilst also being deformable so as to transfer variations in pressure from the first volume to the second volume of the sound transmission device. The first and second membranes are configured to vibrate in response to pressure variations that are transmitted through the sound transmission device 206 whilst preventing flow of exhaust gases from flowing from the first volume to the second volume.

The first and second flexible membranes 302, 304 move in response to changes in pressure that are transmitted through the sound transmission device. The first and second flexible membranes 302, 304 are connected together by a connecting member 306. The connecting member 306 allows sound vibrations to travel between the first flexible membrane 302 and the second flexible membrane 304. The first flexible membrane 302 is configured to move in accordance with sound pulses received from the inlet of the sound transmission device. Thus, by connecting the first flexible membrane 302 to the second flexible membrane 304, the connecting member 306 permits variations in pressure experienced by the first flexible membrane 302 to pass through the diaphragm to the second flexible membrane 304. In other words, the connecting member 306 transfers sound vibrations through the diaphragm 316 from the first flexible membrane 302 to the second flexible membrane 304. As the first flexible membrane 302 is in the first volume 212 and the second flexible membrane 304 is in the second volume 214, the connecting member 306 transfers sound vibrations through the diaphragm 316 from the first volume 212 to the second volume 214. To optimise the transmission of sound pulses from the first flexible membrane 302 to the second flexible membrane 304, the connecting member may be in the form of a rigid shaft.

The diaphragm 316 further comprises a rigid barrier 308 separating the first volume 212 from the second volume 214. The rigid barrier 308 is configured to restrict the transmission of heat between the first and second volumes 212, 214. The rigid barrier 308 may prevent the transmission of heat between the first and second volumes 212, 214. In other words, the walls of the rigid barrier 308 may be impermeable to heat and pressure variations. The rigid barrier acts to thermally insulate the first volume from the second volume, and vice versa. The presence of the rigid barrier 308, in addition to that of the first and second membranes 302, 304, is configured to prevent exhaust gases from flowing from the first volume 212 to the second volume 214.

The rigid barrier 308 comprises a channel 310 through which the connecting member 306 is able to extend. The channel 310 allows the connecting member 306 to pass between the first volume 212 and the second volume 214 in order to transfer vibrations from the first flexible membrane 302 to the second flexible membrane 304. The diaphragm may further comprise a seal 312 positioned within the channel 310 and configured to hold the connecting member 306 in place within the channel 310. The seal 312 comprises an outer diameter that is substantially the same as the inner diameter of the channel 310, and an inner diameter that is substantially the same as the outer diameter of the connecting member 306. This ensures a tight fit between both the seal 312 and the channel 310, and the seal 312 and the connecting member 306. In one example, the seal 312 may be press fitted into the channel 310. Additionally, or alternatively, the connecting member 306 may be press fitted onto the seal 312. The seal 312 also ensures that, whilst the connecting member 306 is able to transfer sound vibrations between the first volume 212 and the second volume 214 through the rigid member 308, the transmission of heat between the first and second volumes 212, 214 is minimised. The transmission of exhaust gases between the first and second volumes 212, 214 is also minimised by the seal 312. The seal 312 may be made of any material that is capable of withstanding the pressure and temperature variations experienced by the sound transmission device. The seal may be constructed from industrial rubber, Polytetrafluoroethylene (PTFE), Fluorosilicone (FVMQ), Polyurethane, or any other suitable material.

The first and second flexible membranes 302, 304 are connected to the first and second volumes 212, 214 respectively by elastic connectors 314*a*, 314*b*. Each flexible membrane may have a single elastic connector extending around the inner circumference of the wall of the first or second volume (as illustrated in FIG. 3). That is, the first flexible membrane 302 may comprise a first elastic connector 314*a* connecting it around the circumference of the inner wall of the first volume 212. The second flexible membrane 304 may comprise a second elastic connector 314*b* connecting it around the circumference of the inner wall of the second volume 214. The diaphragm 316 may comprise any alternative number of elastic connectors. For example, each of the first and second flexible membranes may comprise two elastic connectors. The purpose of the elastic connectors is to allow the first and second flexible membranes to vibrate with respect to the walls of the first and second volumes. The elastic connectors may be formed from any suitable material that allows the membranes to vibrate with respect to the walls of the first and second volumes. In one example, the elastic connectors may be rubber springs.

The configuration of the diaphragm 316 illustrated in FIG. 3 is advantageous because it minimises the pressure gradient experienced by the membranes of the diaphragm due to the variation in temperature across the first and second volumes. During operation of the sound transmission device, the first volume 212 is exposed to gases that flow in from the exhaust system of a vehicle. The gases traveling through the exhaust system are hot, and so the first volume 212 is exposed to high temperatures. The second volume 214 is exposed to gases that flow in from the exterior or within the cabin of a vehicle. These gases are cool, relative to those that travel through the exhaust system, and so the second volume 214 is exposed to lower temperatures than the temperatures to which the first volume 212 is exposed. Separating the hot first volume 212 from the cooler second volume 214 using a diaphragm comprising a single membrane exposes that membrane to a steep heat gradient, and therefore to a steep pressure gradient that is experienced across the sound transmission device. This pressure gradient may cause a single membrane to deform, negatively affecting its ability to transfer sound vibrations across the sound transmission device. In contrast, by thermally isolating the first volume 212 from the second volume 214 using a rigid barrier 308, and by transmitting sound vibrations across the device using two flexible membranes 302, 304 and a connecting member 306 connecting the first flexible membrane to the second membrane, the pressure differential experienced by the diaphragm is minimised whist the ability of the diaphragm to transmit sound vibrations from the first volume to the second volume is maintained. This diaphragm arrangement can therefore be used to optimise the performance of the sound transmission device.

The diaphragm 316 may further comprise one or more balance orifices for equalising the pressure that is built up in the first and second volumes 212, 214 respectively. The first volume 212 may comprise first orifices 318*a*, 318*b*. The second volume 214 may comprise second orifices 320*a*, 320*b*.

The first orifices 318*a*, 318*b* may be located in the first flexible membrane 302 of the first volume. The first orifices may pass through the first flexible membrane 302, connecting a first side of the first volume 212 located between the first flexible membrane 302 and the first end 208 of the sound transmission device from a second side of the first volume 212 located between the first flexible membrane 302 and the rigid barrier 308. The first orifices 318*a*, 318*b* may be holes of any suitable shape, such as circular. In FIG. 3 the first volume comprises two orifices 318*a*, 318*b*. In alternative examples the first volume may comprise one orifice, or more than two orifices. The orifices act to prevent pressure from building up in the second side of the first volume 212 by providing one or more openings that allow gases from the second side of the first volume to be distributed to the first side of the first volume. The orifices thereby ensure that the pressure gradient across the first volume 212 is minimised. Thus, the presence of the orifices in the first flexible membrane 302 act to prevent the first flexible membrane from deforming by minimising the pressure gradient across the membrane.

It is advantageous that the orifices in the first volume 212 are located in the first flexible membrane 302, instead of being located in the walls of the first volume 212, because this ensures that exhaust gases present in the first volume are unable to escape from the sound transmission device into other parts of the vehicle such as the cabin.

The second orifices 320*a*, 320*b* may be located in the walls of the second volume 214. The first orifices may pass through the walls of the second volume 214, connecting the inside of the second volume 214 from the exterior of the sound transmission device. The second orifices 320*a*, 320*b* may be holes of any suitable shape, such as circular. In FIG. 3 the second volume comprises two orifices 320*a*, 320*b*. In alternative examples the second volume may comprise one orifice, or more than two orifices. The second orifices 320*a*, 320*b* act to prevent pressure from building up in the second volume 214 by providing one or more openings that allow compressed gases from the second volume to be distributed to the atmosphere. The orifices may be located on a first side of the second volume 214 located between the rigid barrier 308 and the second flexible membrane 304. The orifices thereby ensure that the uniform pressure gradient on either side of the second flexible membrane 304 in minimised by dispersing gases on the first side of the second volume to the atmosphere.

It is advantageous that the orifices in the second volume are located in the walls of the second volume 214 and not the second flexible membrane 304 because it is cheaper to form these orifices in the walls of the second volume than it is to form them in the second flexible membrane. As there are no exhaust gases in the second volume 214, it is less important if gases from the second volume are expelled out of the sound transmission device than it is if they are expelled from the first volume. Another benefit of the second orifices 320*a*, 320*b* being located in the walls of the second volume 214 is that this maintains the acoustic performance of the second flexible membrane 304. It is beneficial to maintain the acoustic performance of the second flexible membrane 304 because it is this membrane that carries sound vibrations from the vehicle engine out of the sound transmission device.

In an alternative example, the second orifices 320*a*, 320*b* may be located in the second membrane 304. In other words, in this second example, the second orifices may pass through the second flexible membrane 304, connecting a first side of the second volume 214 located between the first flexible membrane 304 and the rigid barrier 308 of the sound transmission device from a second side of the second volume 214 located between the second flexible membrane 304 and the second end 210 of the sound transmission device.

In the examples described above, the sound bypass device comprises a sound inlet which is connected to a first location on the exhaust system before one of the exhaust components along the flow path of the exhaust gases. However, in an alternative examples, the inlet of the sound bypass device may be connected to the air intake system 108 for the vehicle. Connecting the inlet of the sound bypass device to the air intake system (instead of the exhaust system) has little effect on the sound vibrations that are transferred from the system to the sound transmission device but does expose the first volume 212 of the device lower temperatures than those experienced if the inlet is connected to the exhaust system. This reduces the difference in heat experienced across the sound transmission device, which is beneficial in ensuring that suitable transmission loss values are met.

Similarly, the gases that are prevented from passing from the first volume 212 to the second volume 214 of the sound transmission devices described above are described as "exhaust gases". However, in alternative examples such as an example where the inlet of the sound bypass device is connected to the air intake system, the gases prevented from passing to the second volume 214 may be referred to as "intake gases". The gases prevented from passing from the first volume to the second volume may alternatively be a combination of intake and exhaust gases.

Figure 4:
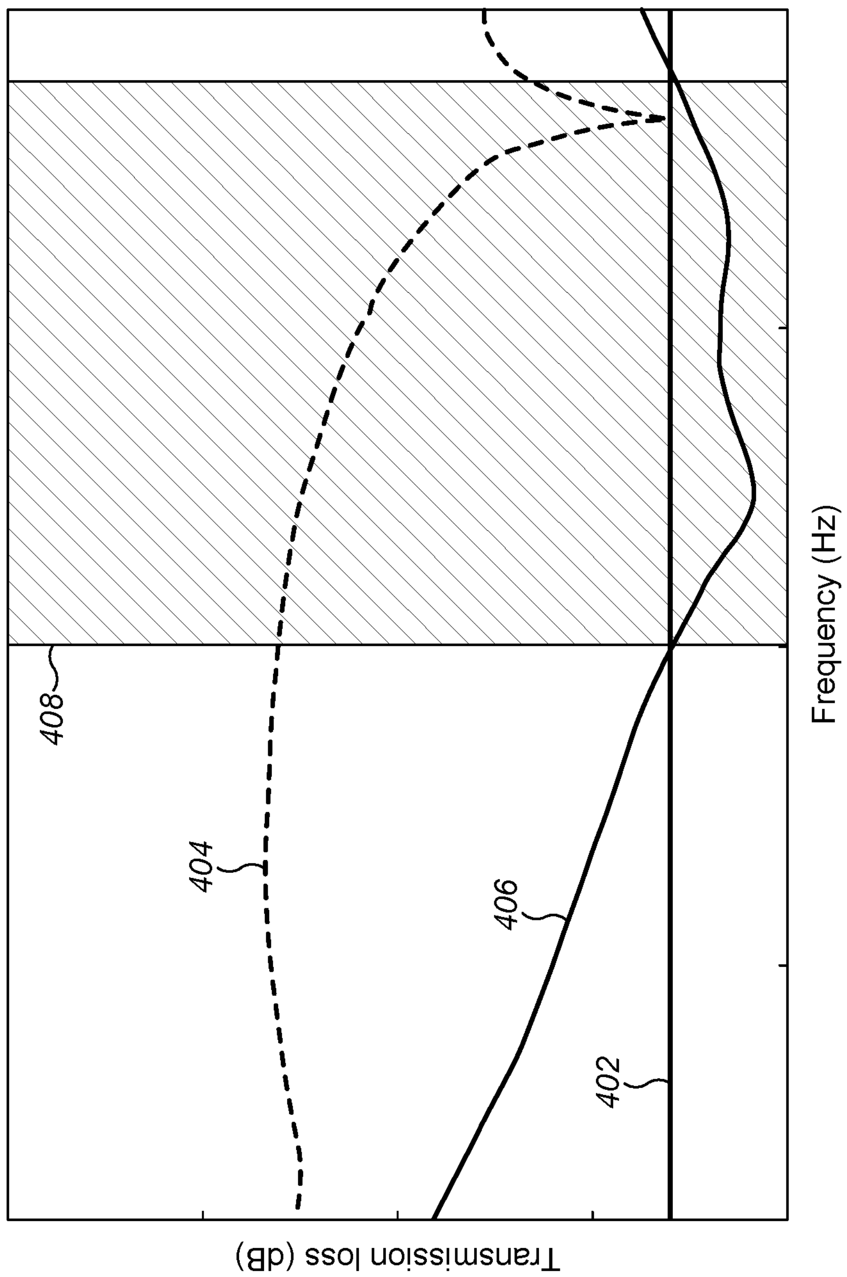
FIG. 4 illustrates the improvements offered by the improved sound bypass device illustrated in FIG. 2.

FIG. 4 illustrates the advantages afforded by the sound bypass device of FIG. 2 as compared to known alternative bypass devices. The graph of FIG. 4 illustrates the variation in transmission loss relative to the frequency of sound vibrations. Sound vibrations, in the context of the present invention, are generated by the engine of the vehicle. The frequency of such vibrations is measured in hertz (Hz) and is plotted along the x-axis of the graph in FIG. 4. Transmission loss is measured in decibels (dB) and is plotted along the y-axis of the graph.

To achieve the desired sound profile for the engine noises of a vehicle comprising a sound bypass device, the transmission loss associated with the bypass device should be below a predetermined threshold value. Transmission loss is defined as the ratio between transmitted and incident pressure waves. Thus, as the transmission loss increases the difference in pressure between the incident and transmitted sound waves increases, so that transmitted sound waves become more damped. In other words, a transmission loss characteristic above the predetermined threshold value for a vehicle will mean that the sound waves output by the engine will be muffled by the sound bypass device. This will degrade the quality of sound output by the vehicle and therefore the perceived performance of the vehicle. An exemplary predetermined threshold value for transmission loss value is illustrated by the line 402 in FIG. 4.

During operation of a vehicle, the frequency of sound vibrations generated by its engine are within a defined range of values. In FIG. 4, this defined range of frequency values is illustrated by reference numeral 408. It would be appreciated that the range of frequency values produced by the engine during its operation varies for different vehicles. The operative conditions of a vehicle may also be characterised by defined pressure and temperature values. For example, the pressure within the vehicle exhaust system during operation may be between 1 and 5 bar, and the temperature within the exhaust system may be between 200 and 1000° C.

The transmission loss characteristic of a sound bypass device is highly dependent on the shape of the components within the device. A known design of a sound transmission device comprises cylindrical first and second volumes with a constant cross-sectional area across their lengths. An indication of the transmission loss characteristic produced by this known design is illustrated by line 404 in FIG. 4. It can be seen that, within the range of frequencies generated by the engine during operative conditions, the transmission loss of the bypass device is above the threshold value 402. Thus, this known design is not desirable for optimising the perceived performance of the vehicle.

The transmission loss characteristic produced by the design of a sound bypass device as illustrated in FIG. 2 is depicted by line 406 in FIG. 4. It can be seen that, within the range of operative frequencies of the vehicle demonstrated in FIG. 4, the transmission loss experienced by the bypass device is below the threshold value 402. Thus, the muffling of the noise produced by the engine of the vehicle is reduced to an acceptable level and the perceived performance of the vehicle is optimised.

The transmission loss characteristic of a sound bypass device is also affected by the material from which components of the device are constructed. The components of the sound bypass device may advantageously be constructed from a metal, such as steel. In one example, the first and second volumes of the sound transmission device, and the output tube of the device, are made from steel. Steel is able to withstand the temperatures and pressures exerted by the vehicle engine whilst ensuring a favourable transmission loss characteristic. In an alternative, more preferable example the first and second volumes of the sound transmission device, and the output tube, are made from titanium. Titanium has a lower weight than many other metals, and therefore provides a further reduced transmission loss characteristic when compared to heavier metals. The components of the sound bypass device may alternatively be constructed from any suitable material that is able to withstand the temperatures and pressures exerted by the vehicle engine whilst ensuring a favourable transmission loss characteristic.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A sound bypass device configured to transmit engine-generated sound pulses from an engine to a sound outlet whilst preventing flow of gases to the sound outlet, the sound bypass device comprising:

- an input tube configured to conduct the engine-generated sound pulses from the engine;
- a sound transmission device connected to the input tube at a first end and to the sound outlet at a second end, the sound transmission device comprising: a first volume connected to the first end, a second volume connected to the second end, and a flexible diaphragm separating the first volume from the second volume and configured to transfer variations in pressure in the first volume to the second volume; and
- an output tube configured to conduct sound pulses to the sound outlet, wherein the output tube has a cross-sectional area that is greater at the sound outlet than at the second end and the rate of increase of the cross-sectional area of the output tube is constant along the length of the output tube;
- wherein the first volume has a cross-sectional area that is greater at the diaphragm than at the first end and the second volume has a cross-sectional area that is greater at the diaphragm than at the second end;
- wherein the flexible diaphragm comprises:
  - a rigid barrier separating the first volume from the second volume;
  - a first flexible membrane located within the first volume;
  - a second flexible membrane located within the second volume; and
  - a connecting member extending though the rigid barrier and connecting the first flexible membrane to the second flexible membrane, the connecting member being configured to transfer sound vibrations from the first flexible membrane to the second flexible membrane; and
  - one or more balance orifices which are located in one or more walls of the second volume.

2. A sound bypass device as claimed in claim 1, wherein the first and second volumes are conical in shape, such that the cross-sectional area of the first and second volumes are defined by respective first and second diameters.

3. A sound bypass device as claimed in claim 2, wherein the first and second diameters increase linearly from the first end to the diaphragm and the second end to the diaphragm respectively.

4. A sound bypass device as claimed in claim 1, wherein the first volume is symmetrical to the second volume about a plane that comprises the flexible diaphragm.

5. A sound bypass device as claimed in claim 1, wherein the output tube is conical in shape, such that the cross-sectional area of the output tube is defined by a third diameter.

6. A sound bypass device as claimed in claim 5, wherein the third diameter increases linearly from the second end to the sound outlet.

7. A sound bypass device as claimed in claim 1, wherein the first volume has a length running from the first end to the diaphragm, the second volume has a length running from the diaphragm to the second end and the output tube has a length running from the second end to the sound outlet, the length of the output tube being greater than the length of each of the first and second volumes.

8. A sound bypass device as claimed in claim 2, wherein a ratio of a minimum to a maximum diameter of the first volume is between 1:3 and 1:4.

9. A sound bypass device as claimed in claim 2, wherein a ratio of a minimum to a maximum diameter of the second volume is between 1:3 and 1:4.

10. A sound bypass device as claimed in claim 2, wherein a ratio of a minimum diameter of the first volume to a length from the first end to the diaphragm is between 1:1 and 2:3.

11. A sound bypass device as claimed in claim 2, wherein a ratio of a minimum diameter of the second volume to a length from the second end to the diaphragm is between 1:1 and 2:3.

12. A sound bypass device as claimed in claim 5, wherein a ratio of a minimum to a maximum diameter of the output tube is between 1:3 and 1:4, and a ratio of a minimum diameter of the output tube to a length from the second end to the sound outlet is between 1:3 and 1:5.

13. A sound bypass device as claimed in claim 1, wherein the first volume is aligned with the second volume along a common axis.

14. A sound bypass device as claimed in claim 13, wherein the output tube is at least partially aligned the second volume along the common axis.

15. A sound bypass device as claimed in claim 1, wherein the diaphragm is connected across the sound transmission device to prevent flow of gases from the first volume to the second volume.

16. A sound bypass device as claimed in claim 1, wherein the connecting member is directly attached to the first and second flexible membranes and configured to directly transfer sound vibrations from the first flexible membrane to the second flexible membrane.

17. A sound bypass device as claimed in claim 1, wherein the rigid barrier further comprises a channel through which the connecting member is able to extend, and the flexible diaphragm further comprises a seal positioned within the channel and configured to hold the connecting member in place within the channel.

18. A sound bypass device as claimed in claim 16, wherein the diaphragm further comprises one or more first balance orifices which are located in the first flexible membrane.

19. A vehicle comprising:

an internal combustion engine having at least one cylinder, the internal combustion engine comprising an exhaust manifold for collecting gases expelled from the at least one cylinder;

an air intake system for providing a supply of air to the internal combustion engine;

an exhaust system configured to channel gases from the internal combustion engine along a flow path from the exhaust manifold to at least one exhaust outlet, the exhaust system comprising at least one exhaust component configured to act on gases flowing though the exhaust component and causing an alteration to engine-generated sound pulses passing through the exhaust component;

a sound bypass device as claimed in claim 1, wherein the input tube is connected to a first location on either the air intake system or the exhaust system, and the sound outlet is located at a second location on the exterior or within the cabin of the vehicle.

20. A sound bypass device as claimed in claim 1, wherein the output tube is directly connected to the second end of the sound transmission device.

21. A sound bypass device configured to transmit engine-generated sound pulses from an engine to a sound outlet whilst preventing flow of gases to the sound outlet, the sound bypass device comprising:

an input tube configured to conduct the engine-generated sound pulses from the engine;

a sound transmission device connected to the input tube at a first end and to the sound outlet at a second end, the sound transmission device comprising: a first volume connected to the first end, a second volume connected to the second end, and a flexible diaphragm separating the first volume from the second volume and configured to transfer variations in pressure in the first volume to the second volume; and an output tube connected to the second end of the sound transmission device and configured to conduct sound pulses to the sound outlet, wherein the output tube has a cross-sectional area that is greater at the sound outlet than at the second end and the rate of increase of the cross-sectional area of the output tube is constant along the length of the output tube;

wherein the first volume has a cross-sectional area that is greater at the diaphragm than at the first end and the second volume has a cross-sectional area that is greater at the diaphragm than at the second end;

wherein the flexible diaphragm comprises:

a rigid barrier separating the first volume from the second volume;

a first flexible membrane located within the first volume;

a second flexible membrane located within the second volume; and a connecting member extending though the rigid barrier and connecting the first flexible membrane to the second flexible membrane, the connecting member being configured to transfer sound vibrations from the first flexible membrane to the second flexible membrane; and one or more balance orifices which are located in one or more walls of the second volume.

* * * * *